Oct. 3, 1933.    A. F. POOLE    1,928,793
SYSTEM AND METHOD FOR INDICATING TIME
Filed Sept. 29, 1930    2 Sheets-Sheet 1

*Transmitting Station*

*Receiving Station*

*Transmitting Station*

INVENTOR.
Arthur F. Poole

Oct. 3, 1933.    A. F. POOLE    1,928,793
SYSTEM AND METHOD FOR INDICATING TIME
Filed Sept. 29, 1930    2 Sheets-Sheet 2
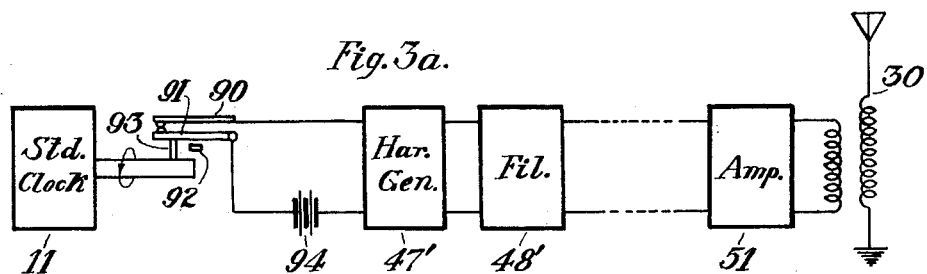
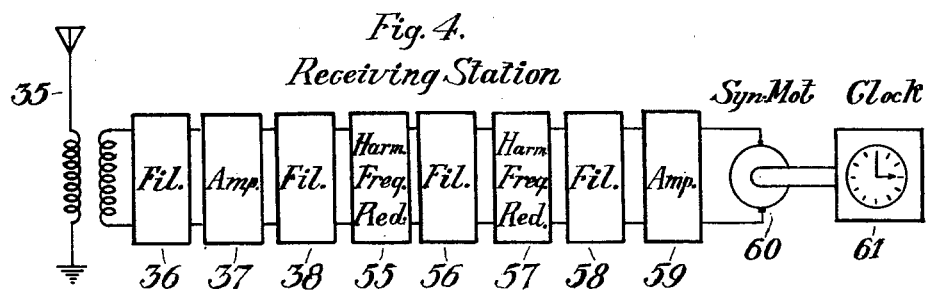
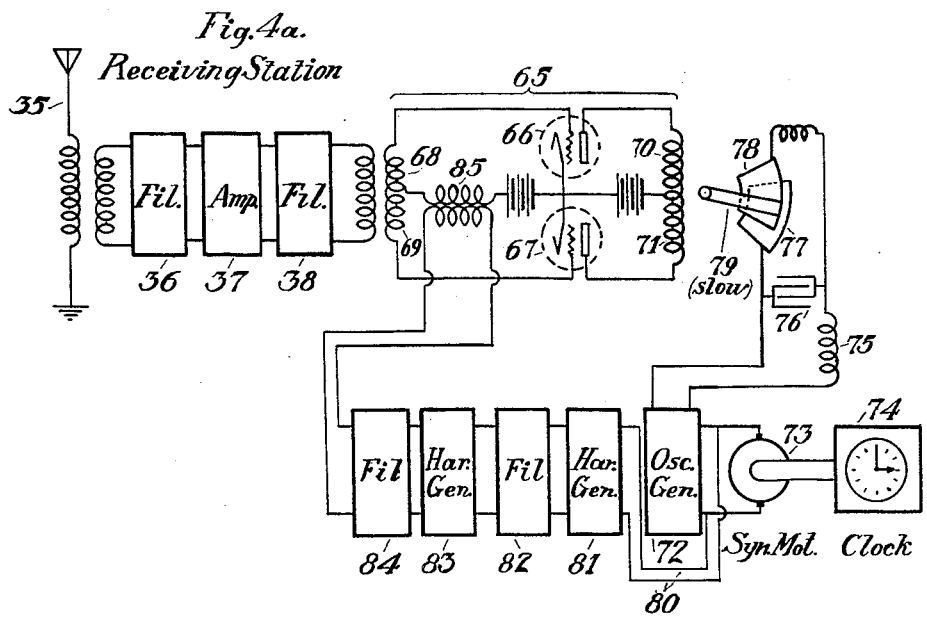
INVENTOR.
Arthur F. Poole Patented Oct. 3, 1933

1,928,793

UNITED STATES PATENT OFFICE 1,928,793

SYSTEM AND METHOD FOR INDICATING TIME

Arthur F. Poole, Ithaca, N. Y.

Application September 29, 1930
Serial No. 485,037

25 Claims. (Cl. 250—2)

An important object of my invention is to provide a new and improved system and method for indicating time at a distance from a standard clock and controlled thereby. Another object is to provide for distant control of a time indicator by suitable radio transmitting and receiving apparatus. Still another object is to provide for sending radio waves having a component of frequency determined by a time standard and actuating or controlling clocks at receiving stations in accordance with said component. These and other objects of my invention will become apparent on consideration of a limited number of specific embodiments of the invention to be disclosed in this specification. It will be understood that the following disclosure relates principally to these particular examples of the invention, and that the scope of the invention will be indicated in the appended claims.

Figure 1:
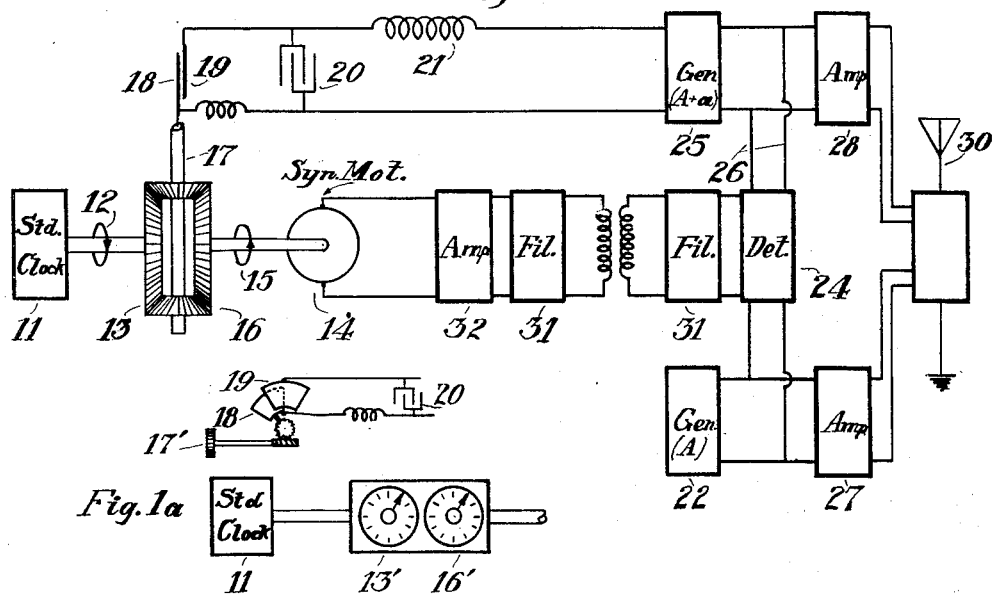
Figure 1:
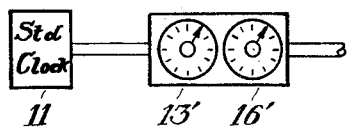
Figure 2:
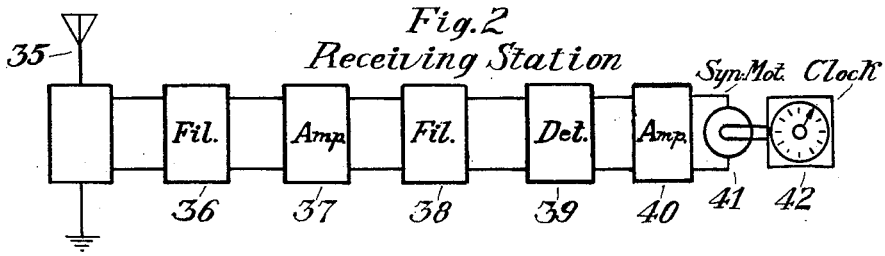
Figure 3:
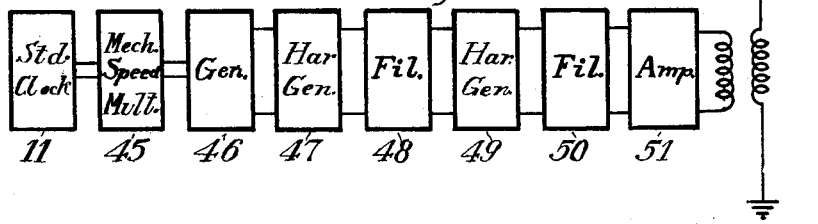

Referring to the drawings, these are diagrams in which Figure 1 shows a transmitting station that sends a standard clock-controlled beat frequency; Figure 1a shows a modification in which there is manual control; Figure 2 shows controlled clock at a receiving station adapted for cooperation with the transmitter of Figure 1 or Figure 1a; Figure 3 shows a standard clock-controlled transmitter of single radio frequency; Figure 3a shows a modification of Figure 3; Figure 4 shows a corresponding receiving station employing oscillators controlled by harmonics; and Figure 4a shows a modified receiving station with oscillators generating harmonics.

In the transmitting system of Figure 1, the standard clock 11 drives the bevel gear wheel 13 in the direction of the arrow 12, while the synchronous motor 14 drives the matched bevel gear wheel 16 in the opposite direction, as indicated by the arrow 15. The gear wheels 13 and 16 form part of a differential gear mechanism whose intermediate member carries the arm 17; this arm 17 will stand still when the rates of rotation indicated by the arrows 12 and 15 are equal, but will be displaced one way or the other according as one such rotation is faster than the other.

The arm 17 carries one plate 18 of an adjustable condenser which has the fixed plate 19. This adjustable condenser 18—19 is of small capacity at any adjustment compared with the parallel condenser 20. These condensers in parallel, with the inductance 21, form the frequency determining circuit of the three electrode vacuum tube oscillation generator 25, whose output current goes as input to the amplifier 28, and the output of amplifier 28 is impressed on the transmitting antenna 30.

At 22 there is a crystal controlled vacuum tube oscillation generator whose output is kept at approximately A cycles per second; this output goes as input to the amplifier 27, and the output of amplifier 27 is impressed on the radiating antenna 30. The amplifiers 27 and 28 being one-way devices prevent reaction on the input side of either due to the output of the other.

Electromotive forces from the generators 22 and 25 are superposed and applied on the input side of the beat detector 24, and the beat frequency output current therefrom is applied through the filter 31 and amplifier 32 to drive the synchronous motor 14 that has been mentioned heretofore. The desired beat frequency is such as to operate the synchronous motor 14 to drive the gear wheel 16 at the same speed of rotation as the clock-driven gear wheel 13, and if the beat frequency has this desired value, then arm 17 will remain stationary. This may be regarded as the normal state of affairs, with the condenser 18—19 at that adjustment which causes the oscillator 25 to operate at $A+a$ cycles per second, where $a$ is the desired beat frequency.

If the crystal controlled generator 22 should change its rate a little, as for example due to temperature changes, this will change the beat frequency, and cause a differential rotation of the arm 17, and a consequent compensatory adjustment of the condenser 18—19 so as to change the rate of the oscillator 25 and hold the beat frequency at the desired value $a$. Similarly, if the oscillator 25 should tend to change its natural rate, a compensatory adjustment will be made in the condenser 18—19 so as to hold the natural rate at the value $A+a$. Suitable means may be provided if needed to prevent the condenser 18—19 from going too far when it is changed in adjustment and setting up an objectionable "hunting." Thus it will readily be seen that the radiating antenna 30 will radiate two superposed frequencies of $A$ and $A+a$, where $A$ is a large number held approximately but not necessarily exactly to a constant value, and $a$ is a comparatively small number that is held strictly to a constant value by the clock 11. Moreover, the beat frequency of the two superposed waves is accurately $a$ cycles per second.

The system of Figure 1a differs from that of Figure 1 in that easily visible and comparable moving index hands 13' and 16' are substituted for the bevel gears 13 and 16 of Figure 1; and the movable condenser plate 18 is adjusted manually at 17' in accordance with a comparison of the indexes 13' and 16'.

Wherever it is desired to have a clock at a certain locality operated to correspond with the standard clock 11 of Figure 1 or Figure 1a, at such locality there may be a receiving station such as shown in Figure 2. Superposed currents of frequencies A and A+a are received by antenna 35 and passed through the filter 36 to the amplifier 37, whose output goes through the filter 38 to the input of the beat detector 39. Its output will be a current of the beat frequency a, and this is applied through the amplifier 40 to drive the synchronous motor 41, which in turn mechanically drives the clock indicator 42. The effect of interference will be only slight, because the frequency range a is very narrow compared to the frequency A, and other frequencies than A and A+a will be excluded for the most part by the filters. Thus at any place within the range of the transmitter of Figure 1 or Figure 1a, a receiving station according to Figure 2 may be set up to operate a local clock exactly or nearly exactly in accordance with the standard clock at the transmitting station.

The alternative transmitting station of Figure 3 sends only one frequency. The standard clock 11 operates through the mechanical speed multiplier 45 to drive or control the alternating current generator 46, which accordingly operates at a definite frequency. The output current from the generator 46 goes to the distorting tube or harmonic generator 47, from which the filter 48 passes a particular harmonic. Again by a repetition of the process this harmonic goes as fundamental into the harmonic generator 49 and the filter 50 passes a higher harmonic. This repetition of the process of stepping the frequency up may be made as many times as needed to get the desired suitable frequency for radiation, and this frequency will be in definite relation to the speed of the standard clock 11. Waves of this frequency will be radiated from the antenna 30 of Figure 3.

Whereas in Figure 3 there is a generator 46 driven from the standard clock 11, in Figure 3a there is a circuit with battery 94 and fixed contact 90 with the movable contact 91 normally open and resting on the stop 92. The standard clock shaft carries a wiper 93 which periodically closes the contacts at 90—91 and sends corresponding pulses of current to the harmonic generator 47' which is similar in performance to 47 in Figure 3 but operates at lower frequency. The filter 48' separates the desired harmonic from the output, and the sequence of alternately disposed harmonic generators and filters is continued in this device of Figure 3a as in that of Figure 3 until the frequency is stepped up a suitable value to be passed through he amplifier 51 and put on the radiating antenna 30.

A receiving station corresponding to the transmitter of Figure 3 or Figure 3a is shown in Figure 4. The received waves are impressed on the receiving antenna 35, and develop currents that go through the filter 36 to the input side of the amplifier 37 whose output goes through the filter 38 to the input of the harmonic frequency reducer 55. This may be a three electrode vacuum tube oscillator having a natural frequency such that the frequency on its input side is very nearly a harmonic thereof; under this condition the oscillator will be forced to operate at precisely the fundamental rate of which its input is a harmonic. For example, if the input is at 1,000 kilocycles, and the natural rate of the oscillator is very nearly 100 kilocycles, it will be receiving its tenth harmonic (counting the fundamental as first), and will operate at nearly the rate of 100 kilocycles. Thus from the filter 38 on the input side of the reducer 55 to the filter 56 on its output side, the frequency is stepped down once, and it may be stepped down again through another reducer 57 and corresponding filter 58, and this process may be repeated as many times as necessary.

Harmonic frequency reducers such as shown at 55 and 57 are sometimes called multivibrators. Such devices may be caused by adjustment to yield any one of several different sub-multiple frequencies or harmonic frequencies. Thus suppose one of them gives a fundamental output for which the input is the tenth harmonic; it may be caused by adjustment to change this fundamental output so that the input will be its ninth harmonic. No such change of adjustment is contemplated in connection with the use of the devices as here described.

Eventually the current of reduced frequency from the last filter 58 of Figure 4 goes to the amplifier 59, and the output therefrom is applied to drive the synchronous motor 60 which drives the clock indicator 61. Thus the local clock 61 is driven at a rate determined by the frequency of the received radiation on the antenna 35, which as we have seen is determined at the sending station by the standard clock 11. Interfering radiation that may fall on the receiving antenna 35 will be excluded for the most part by close tuning and filtering and the clock 61 will operate exactly or very nearly in synchronism with the standard clock 11.

A modified receiving station for a single pure frequency is shown in Figure 4a. The received waves of this frequency fall on the antenna 35 and the corresponding currents are filtered at 36, amplified at 37, again filtered at 38 and applied to the phase comparing device 65, whose construction and operation will be described presently.

A low frequency oscillation generator is provided at 72; its frequency determining circuit comprises the inductance 75 and the two capacities 76 and 77—78 in parallel, the latter being in the form of an adjustable condenser with fixed plate 77 and adjustable plate 78. The natural frequency of the generator 72 is approximately a definite sub-multiple of the received frequency on the antenna 35. How the precise adjustment is effected at 77—78 will be described presently.

The current from the generator 72 drives the synchronous motor 73, which in turn drives the clock indicator 74. Also by a branch circuit 80, current of the same low frequency is put into the harmonic generator 81, which operates on the same principle as the harmonic generators 47 and 49 of Figure 3. Thus through the succession of alternate harmonic generators and filters such as 81, 82, 83 and 84, the current is stepped up in frequency and its electromotive force is applied in the phase comparer 65 through the secondary winding 85 of a transformer.

The two three electrode vacuum tube detectors 66 and 67 are connected up as shown in Figure 4a. If the electromotive forces applied on their grids through the windings 68—69 and 85 respectively are in quadrature, then the currents in the two plate circuits will be augmented equally, and these two currents will buck each other in effect in the windings 70 and 71, and there will be no effect on the polarized armature 79 that carries the movable plate of the condenser 77—78. As long as the two electromotive forces in 68—69 and in 85 are of exactly the same frequency they will remain in quadrature and there will be no impulse toward adjustment on the movable condenser plate 78. These two electromotive forces are received respectively from the station of Figure 3 and as stepped up in frequency from the local generator 72. The former will remain constant in value, but of course the generator 72 may tend to vary its adjustment of frequency from time to time. Any such tendency will cause a departure from the quadrature relation of the electromotive forces in the respective windings 68—69 and 85. This will result in an increase of amplitude on the grid of one of the tubes 66 and 67, and a corresponding decrease on the other. Accordingly in one coil 70 or 71 there will be a greater detector output current than in the other, and the polarized armature 79 will be deflected accordingly to effect a compensatory adjustment of the condenser 77—78, by which the tendency of the generator 72 to change its rate will be corrected.

Thus the phase comparing device 65 compares a certain current that is stepped up in frequency from the generator 72 with the current received through the antenna 35 from the distant standard clock controlled station of Figure 3 or Figure 3a, and by such comparison the device 65 makes adjustment of the condenser 77—78 in the frequency controlling circuit of the said local generator 72 so as to hold its speed in precise relation to the rate of the said standard clock 11. Any harmful effect of static or other interference is minimized by making the adjustment slow as indicated by the legend "slow" with the armature 79; moreover, this feature of construction prevents "hunting." If there should be any brief interruption in the reception on the antenna 35, the generator 72 would continue to operate at its last adjustment, and would therefore not be far wrong when the received current came on again.

By careful filtering and tuning, any one of the receiving systems of Figures 2, 4 and 4a may be made selectively to receive the carrier frequency of a carrier current broadcasting system, that is, a system that sends out waves of carrier frequency modulated at voice frequencies. In such case the associated clock indicator will in effect count the successive cycles of the carrier and give a cumulative measure thereof. By comparing this indication from time to time with a standard clock the carrier frequency can be ascertained accurately, and it can be learned whether the corresponding transmitting station is holding properly to its assigned carrier frequency.

I claim:

1. A standard clock, a radio transmitter associated therewith, means to control the frequency of said transmitter according to said clock, a radio receiver at a distance from said transmitter, a clock associated therewith, and means to control said last mentioned clock according to the frequency of the radio waves received from said transmitter.

2. The method of controlling a clock by a standard clock which consists in radiating electric waves of a frequency determined by said standard clock and receiving such waves and applying corresponding currents in the receiving apparatus to determine the rate of the controlled clock according to said frequency.

3. A standard clock, a transmitting antenna associated therewith, means to radiate electric waves therefrom, means to determine the frequency of such waves by said clock, a receiving antenna, a clock associated therewith which is to be controlled, means to develop electric currents of frequency determined by the frequency of the waves received by said receiving antenna from said transmitting antenna, and means to apply such currents to determine according to their frequency the rate of the clock that is to be controlled.

4. A standard clock, a transmitting antenna associated therewith, means to generate two electric currents of relatively high and low frequency respectively, means to govern the frequency of the lower current from the said clock and to govern the frequency of the higher current from the lower current, means to radiate waves of at least the higher frequency from the antenna, a receiving antenna, a clock associated therewith, and means to develop currents corresponding to the electric waves received from said transmitting antenna and to supply such currents to control said clock according to their frequency.

5. The method of controlling a clock by a standard clock which consists in generating two electric currents of relatively high and low frequency respectively, governing the frequency of the lower current by the said clock and governing the frequency of the higher current from the lower current, radiating electric waves of at least the higher frequency, receiving such waves and developing electric currents therefrom, and applying such currents to govern the controlled clock.

6. A standard clock, a transmitting antenna associated therewith, means to generate two electric currents of relatively high and low frequency respectively, means to govern the frequency of the lower current from the said clock and to govern the frequency of the higher current from the lower current, means to radiate waves of at least the higher frequency from the antenna, a receiving antenna, a clock associated therewith, means to develop two currents of relatively high and low frequency and to govern one such current according to a received frequency and to govern the other such current from the said one current, and means to govern said last mentioned clock according to the lower current.

7. At a radio transmitting station, two high frequency generators, a radiating antenna fed thereby, a local detector to develop current of the beat frequency from said generators, a synchronous motor operated by said current, a standard clock, means to compare the speed of the clock and the motor, and means to adjust the frequency of one of said generators in accordance with said comparing means whereby the radiated beat frequency will be kept constant according to the rate of the clock.

8. The method of radiating electric waves with a component at a certain frequency for the purpose of clock control which consists in generating and radiating two high frequency currents, detecting their beat frequency, comparing this frequency with the rate of a standard clock, and adjusting the frequency of one of the high frequency currents accordingly to keep the beat frequency constant.

9. At a radio transmitting station, two high frequency generators, a radiating antenna fed thereby, a local detector to develop current of the beat frequency from said generators, a synchronous motor operated by said current, a standard clock, means to compare the speed of the clock and the motor, and means to adjust the frequency of one of said generators in accordance with said comparing means whereby the radiated beat frequency will be kept constant according to the rate of the clock; and at a corresponding radio receiving station a receiving antenna, a beat detector, a synchronous motor operated by the detector output current, and a clock driven by said motor, whereby the last mentioned clock is controlled by said standard clock.

10. The method of clock control which consists in generating two high frequency electric currents and radiating them at a transmitting station, detecting their beat frequency at that station, comparing this frequency with the rate of a standard clock, adjusting the frequency of one such current to keep the beat frequency constant, receiving the waves of the two frequencies at a corresponding receiving station, detecting their beat frequency, and applying the beat frequency current to operate a synchronous motor driven clock at the same rate as the standard clock.

11. At a radio transmitting station, a standard clock, a differential gear mechanism with one side driven by said clock, two oscillation generators, one crystal controlled and the other having a frequency determining inductance-capacity circuit, a detector to get a beat frequency current from said generators, a synchronous motor driven by said current, said motor driving the other side of said differential gear mechanism, the intermediate member of said differential gear mechanism being connected to adjust the capacity in said frequency determining circuit whereby the beat frequency is held constant to the clock rate, and an antenna to radiate energy supplied by said generators; and at a corresponding radio receiving station, an antenna, a beat detector to detect the current of said beat frequency, a synchronous motor driven according to the detector output, and a clock driven by the synchronous motor.

12. At a transmitting station, a standard clock, a low-frequency oscillation generator operated thereby, means to step up the frequency of its output in a definite ratio, an antenna to radiate waves of corresponding stepped-up frequency; and at a receiving station, a controlled clock, a low-frequency synchronous motor driving said clock, and means to govern the speed of said motor at a definite sub-multiple ratio to the frequency of the received waves.

13. The method of clock control which consists in generating an electric current of low frequency determined by a standard clock, stepping up the frequency of such current in definite ratio, radiating corresponding electric waves, receiving said waves as an electric current of corresponding high frequency, generating a low-frequency current at the receiving station to drive a controlled clock, and applying said high frequency current to control said low frequency current in a definite stepped down ratio, whereby the controlled clock is made to run with the standard clock.

14. At a transmitting station, a standard clock, a low-frequency oscillation generator operated thereby, means to step up the frequency of its output in a definite ratio, an antenna to radiate waves of corresponding stepped-up frequency; and at a receiving station, a controlled clock, a low-frequency synchronous motor driving said clock, an antenna to receive the radiated waves, a circuit in which to develop a local current of corresponding frequency, and a harmonic ratio generator connecting said circuit and said synchronous motor whereby the controlled clock is kept in step with the standard clock.

15. At a transmitting station, a standard clock, a low-frequency oscillation generator operated thereby, means to step up the frequency of its output in a definite ratio, an antenna to radiate waves of corresponding stepped-up frequency; and at a receiving station, a controlled clock, a low-frequency synchronous motor driving said clock, an antenna to receive the radiated waves, a circuit in which to develop a local current of corresponding frequency, and a harmonic frequency reducer to step down the frequency of said current, the output therefrom being connected to drive said synchronous motor.

16. At a transmitting station, a standard clock, a low-frequency oscillation generator operated thereby, means to step up the frequency of its output in a definite ratio, an antenna to radiate waves of corresponding stepped-up frequency; and at a receiving station, a controlled clock, a low-frequency synchronous motor driving said clock, an oscillation generator supplying current to said motor, a frequency determining inductance-capacity circuit for said generator, a harmonic generator to step up the frequency from said oscillation generator, a phase comparer to compare the received frequency with the stepped-up frequency, and a connection from said phase comparer to adjust the capacity in said frequency determining circuit.

17. At a transmitting station, a standard clock, a low-frequency oscillation generator operated thereby, means to step up the frequency of its output in a definite ratio, an antenna to radiate waves of corresponding stepped-up frequency; and at a receiving station, a controlled clock, a low-frequency synchronous motor driving said clock, an adjustable oscillation generator supplying current to said motor, a harmonic generator to step up the frequency from said oscillation generator, an antenna to receive the waves radiated from the transmitting station, associated apparatus in which to develop oscillatory currents corresponding to the received waves, means to compare the frequencies of these last mentioned currents with the currents from said harmonic generator, and means dependent on said last mentioned means to adjust the frequency of said adjustable oscillation generator.

18. A standard clock, a radio transmitter associated therewith, means to control the frequency of said transmitter according to said clock, a radio receiver at a distance from said transmitter, a clock associated therewith, means to control said last mentioned clock according to the frequency of the radio waves received from said transmitter, and means to exclude interference from substantially affecting the controlled clock and to continue the controlled clock in operation when the transmission is interrupted.

19. A standard clock, a transmitting antenna associated therewith, means to generate two electric currents of relatively high and low frequency respectively, means to govern the frequency of the lower current from the said clock and to govern the frequency of the higher current from the lower current, means to radiate waves of at least the higher frequency from the antenna, a receiving antenna, a clock associated therewith, means to develop two currents of relatively high and low frequency and to govern one such current according to a received frequency and to govern the other such current from the said one current, and means to govern said last mentioned clock according to the lower current, said last mentioned means comprising a slow-acting link whereby the effect of interference or interruption of transmission is minimized.

20. A standard clock, a radio transmitter associated therewith, means to generate an electric current having components of several different frequencies, means to control the frequency of one of the components by said clock, a radio transmitter to radiate electric waves corresponding to said current, a radio receiver at a distance to receive such waves, selective means associated therewith to separate out a current of frequency corresponding to said component controlled by the clock and a clock controlled by said last mentioned current.

21. In combination, a standard clock, an oscillation generator of a certain approximate frequency, a device to compare the generator output frequency with the clock rate, means controlled by said device to adjust the output frequency of said generator more precisely to hold a constant ratio to the rate of said clock, means to radiate electric waves corresponding in frequency to said generator, a receiver to receive such waves, and a clock associated with said receiver and controlled by the current corresponding with said certain frequency in said waves.

22. In combination at a transmitting station, a standard clock, a generator of high frequency oscillatory currents, means to hold the frequency of said generator output in approximately fixed ratio to the clock rate, means to radiate electric waves corresponding to the output from said generator; and at a receiving station means to receive such waves, a clock, and means to hold the rate of said clock in approximately a fixed ratio to the frequency of the received waves.

23. The method of controlling a clock at one place by a standard clock at a distance therefrom, which consists in radiating waves of a certain frequency from an antenna near said standard clock and controlling the frequency to hold it in approximately fixed ratio with the rate of said standard clock, receiving said waves on an antenna near said controlled clock, generating local currents corresponding to the frequency of the received waves and applying said currents to hold said controlled clock at a rate in approximately fixed ratio to the frequency of said currents.

24. A standard clock, a radio transmitter associated therewith, means to control the frequency of said transmitter according to said clock, a radio receiver at a distance from said transmitter, a clock associated therewith, means to control said last mentioned clock according to the frequency of the radio waves received from said transmitter and means to exclude interference from affecting the controlled clock.

25. A standard clock, a radio transmitter associated therewith, means to control the frequency of said transmitter according to said clock, a radio receiver at a distance from said transmitter, a clock associated therewith, means to control said last mentioned clock according to the frequency of the radio waves received from said transmitter and means to continue the controlled clock in operation when transmission is interrupted and at its last adjustment when the interruption occurred.

ARTHUR F. POOLE.